(12) United States Patent
Imahashi

(10) Patent No.: US 9,761,349 B2
(45) Date of Patent: Sep. 12, 2017

(54) ELECTRICALLY CONDUCTIVE PASTE

(71) Applicant: TOYOBO CO., LTD., Osaka-shi, Osaka (JP)

(72) Inventor: Satoshi Imahashi, Otsu (JP)

(73) Assignee: TOYOBO CO., LTD., Osaka-shi (JP)

( * ) Notice: Subject to any disclaimer, the term of this patent is extended or adjusted under 35 U.S.C. 154(b) by 0 days.

(21) Appl. No.: 14/901,763

(22) PCT Filed: Jul. 3, 2014

(86) PCT No.: PCT/JP2014/067730
§ 371 (c)(1),
(2) Date: Dec. 29, 2015

(87) PCT Pub. No.: WO2015/005204
PCT Pub. Date: Jan. 15, 2015

(65) Prior Publication Data
US 2016/0372230 A1    Dec. 22, 2016

(30) Foreign Application Priority Data

| Jul. 8, 2013 | (JP) | 2013-142356 |
| Jul. 9, 2013 | (JP) | 2013-143433 |
| Aug. 28, 2013 | (JP) | 2013-176200 |
| Nov. 13, 2013 | (JP) | 2013-234511 |
| Nov. 13, 2013 | (JP) | 2013-234512 |
| Nov. 18, 2013 | (JP) | 2013-237549 |

(51) Int. Cl.
| B32B 3/00 | (2006.01) |
| H01B 1/22 | (2006.01) |
| C08K 3/08 | (2006.01) |
| C08K 7/06 | (2006.01) |
| C08K 9/04 | (2006.01) |
| C08L 21/00 | (2006.01) |
| H01B 1/24 | (2006.01) |
| C09D 5/24 | (2006.01) |

(52) U.S. Cl.
CPC ............ *H01B 1/22* (2013.01); *C08K 3/08* (2013.01); *C08K 7/06* (2013.01); *C08K 9/04* (2013.01); *C08L 21/00* (2013.01); *C09D 5/24* (2013.01); *H01B 1/24* (2013.01); *C08K 2003/085* (2013.01); *C08K 2003/0806* (2013.01); *C08K 2201/016* (2013.01)

(58) Field of Classification Search
CPC ........ C08K 2003/08; C08K 2003/0806; C08K 2003/085; C08K 9/04; C08K 7/04; C08L 21/00; C09D 5/24; H01B 1/22; H01B 1/24

See application file for complete search history.

(56) References Cited

U.S. PATENT DOCUMENTS

| 2006/0052509 A1 | 3/2006 | Saitoh | |
| 2007/0164260 A1* | 7/2007 | Kuwajima | H01B 1/02 252/512 |
| 2012/0033367 A1 | 2/2012 | Jones et al. | |

FOREIGN PATENT DOCUMENTS

| JP | 2005-97499 A | 4/2005 |
| JP | 2006-83249 A | 3/2006 |
| JP | 2007-173226 A | 7/2007 |
| JP | 2008-198425 A | 8/2008 |
| JP | 2010-163568 A | 7/2010 |
| JP | 2010-525526 A | 7/2010 |
| JP | 2010-192296 A | 9/2010 |
| JP | 2010-254744 A | 11/2010 |
| JP | 2011-216562 A | 10/2011 |
| JP | 2012-54192 A | 3/2012 |
| JP | 2012-166452 A | 9/2012 |
| WO | 2008/131304 A1 | 10/2008 |
| WO | 2009/102077 A1 | 8/2009 |

OTHER PUBLICATIONS

Notification of Transmittal of Translation of the International Preliminary Report on Patentability (Form PCT/IB/338) dated Jan. 21, 2016, with Form PCT/IB/373 and Form PCT/ISA/237, issued in counterpart International Application No. PCT/JP2014/067730 (7 pages).
Ahn et al., "Stretchable electronics: materials, architectures and integrations", Journal of Physics D: Applied Physics, 45, 103001, pp. 1-14, 2012, (14 pages).
Chun et al., "Highly conductive, printable and stretchable composite films of carbon nanotubes and silver" Nature Nanotechnology, vol. 5, pp. 853-857, Dec. 2010, (5 pages).
International Search Report dated Sep. 16, 2014, issued in counterpart Application No. PCT/JP2014/067730 (2 pages).

* cited by examiner

*Primary Examiner* — Elizabeth Mulvaney
(74) *Attorney, Agent, or Firm* — Westerman, Hattori, Daniels & Adrian, LLP

(57) ABSTRACT

The present invention provides an excellent electrically conductive paste which is applicable or printable and stretchable and which ca realize an electrically conductive membrane having high electrical conductivity. An electrically conductive paste wherein a conductive, filler (B) is uniformly dispersed in a resin (A) characterized in that the resin (A) is a rubber (A1) containing sulfur atom and/or a rubber (A2) containing nitrile group, and that the conductive filler (B) is metal powder (B1) having an average particle diameter of 0.5 to 10 μm and a conductive material (B2) having a group selected from mercapto group, amino group and nitrite group on its surface and having an aspect ratio of 10 to 10,000. Instead of having said group on the surface, the conductive filler (B) may be subjected to a surface treatment with a rubber containing sulfide bond and/or nitrite group. Also, the conductive filler (B) may be metal nanowire.

25 Claims, No Drawings

ELECTRICALLY CONDUCTIVE PASTE

TECHNICAL FIELD OF THE INVENTION

The present invention relates to an electrically conductive paste for preparing an electrically conductive membrane suitable for stretchable electrodes and wirings.

BACKGROUND ART

Most of highly efficient electronics are basically in a rigid and planar shape and use a single crystal inorganic material such as silicon and gallium-arsenic. On the other hand, when a flexible substrate is used, resistance of the wiring against bending is demanded. Moreover, in the use such as actuator electrodes and skin sensors, an electrically conductive material showing high stretchability is demanded. When a membrane of a stretchable electrically conductive material is used for example, it is possible to develop a device which can closely attach to and adapt to human body which is flexible and curvilinear. Use of the device as such ranges from the measurement of electrophysiological signals to the delivery in advanced therapy as well as the interface between humans and machines. One of the solving methods in the development of stretchable electrically conductive materials is to use an organic electrically conductive material. Although the materials known up to now are flexible, they are not stretchable and they cannot cover curvilinear surfaces. Therefore, they are unreliable in their property and their integration into complicated integrated circuits. Membranes of other materials such as metal nanowire and carbon nanotube are favorable to some extent but they are unreliable and expensive whereby development thereof is difficult.

As to approaches for developing a stretchable flexible wiring, two methods have been mainly reported.

One is a method wherein a corrugated structure is constructed so as to make even fragile materials stretchable (see Non-Patent Document 1). In this method, a thin metal membrane is prepared on a silicone rubber by means of vapor deposition, metal plating, photoresist treatment, etc. Although a thin metal membrane shows stretchability of only a few percents, stretchability can be shown when the thin metal membrane is made in a zigzag shape, a continuous horseshoe shape or a corrugated shape, or when the thin metal membrane is made in a wrinkled shape or the like by forming the thin metal membrane on a previously stretched silicone rubber. However, in any of the above, electric conductivity lowers to an extent of two digits or more when the thin metal membrane is stretched by several tens percents. In addition, since silicone rubber has low surface energy, adhesion between the wiring and the substrate is weak whereby there is a disadvantage that detachment is apt to happen upon stretching. Accordingly, in this method, it is difficult to achieve both high electrical conductivity and high stretchability. Moreover, there is another problem that the manufacturing cost is high.

Another approach is a composite material consisting of an electrically conductive material and an elastomer. Advantages of this material are excellent printing property and stretchability. In a commercially available silver paste used for electrodes and wirings, high amount of silver powder is filled in and compounded with a binder resin of high elasticity whereby flexibility is poor and elasticity is high. Upon stretching, cracks are generated and the electrical conductivity significantly lowers. In view of the above, there have been carried out the investigations in rubber and elastomer as a binder for imparting the flexibility and also the investigations in silver flakes, carbon nanotube, metal nanowire, etc. which have large aspect ratio as a conductive material and high electrical conductivity for lowering the filling rate of a conductive material. There have been reported a combination of silver particles with silicone rubber (see Patent Document 1), a combination of silver particles with polyurethane (see Patent Document 2), a combination of carbon nanotube with ionic liquid and vinylidene fluoride (see Patent Documents 3 and 4), etc. However, it is the current status that, even in those combinations, it is still difficult to achieve both high electrical conductivity and high stretchability. On the other hand, there has been reported a composite material which is printable, highly conductive and stretchable by means of a combination of silver particles in a micron size with polyvinylidene fluoride and carbon nanotube which has been subjected to a surface modification with self-organized silver nanoparticles (see Non-Patent Document 2). However, the surface modification or carbon nanotube with silver nanoparticles is not preferred because its manufacture is troublesome causing an increase in cost.

PRIOR ART DOCUMENTS

Patent Documents

Patent Document 1: Japanese Patent Application Laid-Open (JP-A) No. 2007-173226
Patent Document 2: Japanese Patent Application Laid-Open (JP-A) No. 2012-54192
Patent Document 3: WO 2009/102077
Patent Document 4: Japanese Patent Application Laid-Open (JP-A) No. 2011-216562

Non-Patent Documents

Non-Patent Document 1: Jong-Hyun Ahn and Jung Ho Je, "Stretchable electronics: materials, and architectures and integrations" J. Phys. D: Appl. Phys. 45 (2012) 103001
Non-Patent Document 2: Kyoung-Yong Chun, Youngseok Oh, Jonghyun Rho, Jong-Hyun Ahn, Young-Jin Kim, Hyouk Ryeol Choi and Seunghyun Baik, "Highly conductive, printable and stretchable composite films if carbon nanotubes and silver" Nature Nanotechnology, 5, 853 (2010)

DISCLOSURE OF THE INVENTION

Problem that the Invention is to Solve

The present invention has been achieved in view of the background of the prior art as such and its object is to provide an excellent electrically conductive paste which is applicable or printable and stretchable and which can realize an electrically conductive membrane having high electrical conductivity.

Means for Solving the Problem

The present inventors have carried out eager investigations for achieving such an object. As a result, they found that the above problems can be solved by the following means and achieved the present invention.

Thus, the present invention comprises the following constitutions (1) to (12).

(1) An electrically conductive paste wherein a conductive filler (B) is uniformly dispersed in a resin (A), characterized in that the resin (A) is a rubber (A1) containing sulfur atom and/or a rubber (A2) contain nitrile group, that the conductive filler (B) is Metal powder (B1) having an average particle diameter of 0.5 to 10 μm and a conductive material (B2) having a group selected from mercapto group, amino group and nitrile group on its surface and having an aspect ratio of 10 to 10,000, and that compounding amounts of the resin (A), the metal powder (B1) and the conductive material (B2) in the solid content of the electrically conductive paste are 50 to 80% by volume, 19 to 49% by volume and 1 to 10% by volume, respectively.

(2) An electrically conductive paste wherein a conductive filler (B) is uniformly dispersed in a resin (A), characterized in that the resin (A) is a rubber (A1) containing sulfur atom and/or a rubber (A2) containing nitrile group, that the conductive filler (B) is metal powder (B1) having an average particle diameter of 0.5 to 10 μm and a conductive material (B2) having been subjected to a surface treatment with a rubber containing sulfide bond and/or nitrile group and having an aspect ratio of 10 to 10,000, and that compounding amounts of the resin (A), the metal powder (B1) and the conductive material (B2) in the solid content of the electrically conductive paste are 50 to 80% by volume, 19 to 49% by volume and 1 to 10% by volume, respectively.

(3) An electrically conductive paste wherein a conductive filler (B) is uniformly dispersed in a resin (A), characterized in that the resin (A) is a rubber (A1) containing sulfur atom and/or a rubber (A2) containing nitrile group, that the conductive filler (B) is Metal powder (B1) having an average particle diameter of 0.5 to 10 μm and a metal nanowire (B2) having an aspect ratio of 10 to 5,000, and that compounding amounts of the resin (A), the metal powder (B1) and the metal nanowire (B2) in the solid content of the electrically conductive paste are 50 to 80% by volume, 19 to 49% by volume and 1 to 10% by volume, respectively.

(4) The electrically conductive paste according to any of (1) to (3), wherein the rubber (A1) containing sulfur atom is selected from polysulfide rubber, polyether rubber, polyacrylate rubber or silicone rubber containing mercapto group, sulfide bond or disulfide bond.

(5) The electrically conductive: paste according to any of (1) to (3), wherein the rubber (A2) containing nitrile group is a rubber of a copolymer of acrylonitrile with butadiene.

(6) The electrically conductive paste according to any of (1) to (3), wherein the metal powder (B1) is flaky metal powder, spherical metal powder or aggregated metal powder.

(7) The electrically conductive paste according to (1), wherein the conductive material (B2) is a carbon nanotube which has been subjected to a surface treatment with an aromatic compound containing mercapto group, amino group or nitrile group.

(8) The electrically conductive paste according to (2), wherein the conductive material (B2) is a carbon nanotube which has been subjected to a surface treatment with a rubber containing sulfide bond and/or nitrile group.

(9) The electrically conductive paste according to any of (1) to (3), wherein the paste further contains metal nanoparticles (B3) having an average particle diameter of 2 to 100 nm as the conductive filler.

(10) The electrically conductive paste according to (9), wherein the metal powder (B1) and the metal nanoparticles (B3) contain silver and/or copper as main ingredients.

(11) An electrically conductive membrane or an electrically conductive pattern, characterized in that it is prepared by using the electrically conductive paste mentioned in any of (1) to (10).

(12) An electrically conductive laminate, characterized in that it is prepared by forming the electrically conductive membrane or the electrically conductive pattern mentioned in (11) on a fabric substrate.

Advantages of the Invention

In accordance with the electrically conductive paste of the present invention, metal powder (B1) and conductive material (metal nanowire) (B2) are uniformly dispersed in a stretchable resin (A) and, moreover, the metal powder (B1) and the conductive material (metal nanowire) (B2) exhibit good affinity. Accordingly, an electrically conductive membrane formed by the electrically conductive paste of the present invention is highly conductive for forming an effective electrically conductive network and, due to the high aspect ratio of the conductive material metal nanowire) (B2), the electrically conductive network is not broken even upon being stretched whereby its high electrical conductivity can be maintained even upon being stretched.

BEST MODE FOR CARRYING OUT THE INVENTION

As hereunder, the electrically conductive paste according to the embodiments of the present invention will be illustrated.

The first embodiment of the electrically conductive paste according to the present invention relates to an electrically conductive paste wherein a conductive, filler (B) is uniformly dispersed in a resin (A), characterized in that the resin (A) is a rubber (A1) containing sulfur atom and/or a rubber (A2) containing nitrile group, and that the conductive filler (B) is metal powder (B1) having an average particle diameter of 0.5 to 10 μm and a conductive material (B2) having a group selected from mercapto group, amino group and nitrile group on its surface and having an aspect ratio of 10 to 10,000.

The second embodiment of the electrically conductive paste according to the present invention relates to an electrically conductive paste wherein a conductive, filler (B) is uniformly dispersed in a resin (A), characterized in that the resin (A) is a rubber (A1) containing sulfur atom and/or a rubber (A2) containing nitrile group, and that the conductive filler (B) is metal powder (B1) having an average particle diameter of 0.5 to 10 μm and a conductive material (B2) having been subjected to a surface treatment with a rubber containing sulfide bond and/or nitrile group and having an aspect ratio of 10 to 10,000.

The third embodiment of the electrically conductive paste according to the present invention relates to an electrically conductive paste wherein a conductive filler (B) is uniformly dispersed in a resin (A), characterized in that the resin (A) is a rubber (A1) containing sulfur atom and/or a rubber (A2) containing nitrile group, and that the conductive filler (B) is metal powder (B1) having an average particle diameter of 0.5 to 10 μm and a metal nanowire (B2) having an aspect ratio of 10 to 5,000.

The resin (A) is the rubber (A1) which contains sulfur atom, the rubber (A2) which contains nitrile group or a mixture of those (A) and (B). In order to achieve a uniform dispersion of the conductive filler (B) the resin (A) is demanded to have a good affinity to the conductive filler (B) (the metal powder (B1) and the conductive material (metal nanowire) (B2)). Sulfur corresponds to a soft base having a strong orbital interaction. Accordingly, sulfur exhibits a good compatibility with metal which is classified as a soft acid and shows a strong affinity thereto. It has been further known that nitrile group also has high affinity to metal. Although the conductive material (B2) itself is hardly dispersed due to its strong cohesive force and high aspect ratio, its dispersibility is enhanced when a group selected from mercapto group, amino group and nitrile croup is introduced onto its surface. In addition, due to the strong affinity of a group selected from mercapto group, amino group and nitrile group to metal particles, affinity to the metal powder (B1) also increases whereby an effective electrically conductive network can be formed together with the metal powder (B1). With regard to the conductive material (B2) itself, its dispersibility is enhanced when its surface is treated with a rubber containing sulfide bond or nitrile group. In addition, due to a strong affinity of sulfur and nitrile group to metal, affinity to metal powder (B1) is also enhanced whereby an effective electrically conductive network can be formed together with the metal powder (B1). Although the metal nanowire (B2) itself is hardly dispersed due to its strong cohesive force and high aspect ratio, it is uniformly dispersed in a dispersing step because of its high affinity to the rubber (A1) containing sulfur atom or to the rubber (A2) containing nitrile group. Accordingly, the metal nanowire (B2) increases the affinity to the metal powder (B1) as well whereby it can form an effective electrically conductive network with the metal powders (B1). As a result, the electrically conductive paste of the present invention exhibits high electrical conductivity and stretchability and, due to the high aspect ratio of the conductive material (metal nanowire) (B2), it can maintain the high electrical conductivity even upon being stretched. The metal powder (B1) has an average particle diameter of 0.5 to 10 μm and is selected from flaky metal powder, spherical metal powder or aggregated metal powder. In addition thereto, the paste can also contain metal nanoparticles (B3) having an average particle diameter of 100 nm or less. Moreover, since the ingredients of the composition of the present invention can be dissolved or dispersed in a solvent, it can form a conductive membrane or a conductive pattern by means of a process such as application and printing.

There is no particular limitation for the rubber (A1) containing sulfur atom as far as it is a rubber or elastomer containing sulfur. The sulfur atom can be contained in a form such as sulfide bond or disulfide bond in the main chain of the polymer or as mercapto group in side chain or terminal. To be more specific, there may be exemplified polysulfide rubber, polyether rubber, polyacrylate rubber or silicone rubber which contains mercapto group, sulfide bond or disulfide bond. Polysulfide rubber, polyether rubber, polyacrylate rubber or silicone rubber which contains mercapto group is particularly preferred. An especially preferred example is a liquid polysulfurated rubber and it is commercially available from Toray Fine Chemical under a trade name of "Thiokol LP". It is also possible that the rubber is compounded with a sulfur-containing compound such as pentaerythritol tetrakis-(S-mercaptobutyrate), trimethylolpropane tris(S-mercapto-butyrate), mercapto group-containing silicone oil, etc. Amount of the sulfur atom in the rubber (A1) is preferred to be 10 to 30% by weight.

Although there is no particular limitation for the rubber (A2) containing nitrile group as far as it is a rubber or elastomer containing nitrile group, a preferred one is a rubber of a copolymer of acrylonitrile with butadiene. The rubber of a copolymer of acrylonitrile with butadiene is a copolymer of butadiene with acrylonitrile. When the amount of bonding acrylonitrile increases, affinity to metal increases but the rubber elasticity contributing to the stretchability rather decreases. Accordingly, amount of the bonding acrylonitrile in the rubber of a copolymer of acrylonitrile with butadiene is preferred to be 18 to 50% by weight and more preferred to be 28 to 41% by weight.

With regard to the compounding amount of the resin (A) in the electrically conductive paste, when its volume percentage in the solid content is small, electrical conductivity is enhanced while stretchability becomes poor. On the other hand, when its volume percentage is large, stretchability becomes better while electrical conductivity lowers. Accordingly, the compounding amount of the resin (A) in the solid content of the electrically conductive Paste is 50 to 8.0% by volume and preferred to be (30 to 75% by volume. Incidentally, the volume percentage in the solid content can be determined in such a manner that mass of each solid content of each ingredient in the paste is measured, [(mass of each solid content)÷(specific gravity of each solid content)] is calculated and the volume of solid content of each ingredient is calculated.

The electrically conductive paste of the present invention may be compounded with other resin as far as it does not deteriorate the property as a stretchable electrically conductive membrane as well as the application property and the printing property.

The conductive filler (B) is metal powder (B1) and conductive material (metal nanowire) (B2). The metal powder (B1) is used for imparting the electrical conductivity to the formed conductive membrane and conductive pattern.

As to the metal powder (B1), noble metal powder such as silver powder, gold powder, platinum powder or palladium powder and base metal powder such as copper powder, nickel powder, aluminum powder or brass powder are preferred. Other examples are plated powder wherein heterologous particles comprising base metal or inorganic substance such as silica s plated with noble metal such as silver, and base metal powder which is made into alloy using noble metal such as silver. Each of those metal powder's may be used either solely or jointly. Among them, metal powder containing silver powder and/or copper powder as main ingredient (s) (50% by weight or more) is particularly preferred in view of the easiness in prepaying a bat having high electrical conductivity and also of the cost.

Examples of the preferred form of the metal powder (B1) are known flakes, spheres, dendrites, aggregates (a shape wherein spherical primary particles are aggregated into three dimensional shape), etc. Among them, metal powder in flakes, spheres or aggregates is preferred.

In view of giving the fine pattern property, particle diameter of the metal powder (B1) is 0.5 to 10 μm in terms of an average particle diameter. When the metal powder having an average particle diameter is more than 10 μm are used the shape of the formed pattern is bad and there is a possibility that resolving power of the patterned fine lines lowers. When an average particle diameter is less than 0.5 μm, there may be the case wherein the cohesive force of metal powder increases and the printing property becomes bad if large amount of the metal powder is compounded and, in addition, it is expensive and that is not preferred in view of the cost.

Compounding amount of the metal powder (B1) in the electrically conductive paste is determined by taking electrical conductivity and stretchability into consideration. When its percentage by volume in the solid content is big, electrical conductivity becomes high but the amount of the rubber becomes small whereby stretchability becomes bad. When its percentage by volume in the solid content is small, stretchability becomes good but electrically conductive network is hardly formed whereby electrical conductivity becomes low. Accordingly, compounding amount of the metal powder (B1) in the solid content of the electrically conductive paste is 19 to 49% by volume and preferred to be 25 to 40% by volume.

The conductive material (B2) has a group selected from mercapto group, amino group and nitrile group on its surface and has an aspect ratio of 10 to 10,000. As to the conductive material (B2), a carbon nanotube is preferred. A carbon nanotube having a group selected from mercapto group, amino group and nitrile group on its surface is produced by a surface treatment of a carbon nanotube. There is no particular limitation for the carbon nanotube to be treated as far as it satisfies the aspect ratio of the above range.

A carbon nanotube has a structure wherein two-dimensional graphene sheet is rolled in a tubular shape. Depending on the layer numbers and the front end shape, it is divided into multi-wall type, single-wall type and horn type. In addition, depending upon the rolling method of the graphene sheet, it is divided into three types which are armchair type structure, zigzag type structure and chiral type structure. In the present invention, any of a multi-wall type, a single-wall type and a horn type may be used and any of the layer structures is acceptable.

Diameter of a carbon nanotube is preferred to be 0.5 to 200 nm. When a carbon nanotube is used, its aspect ratio is preferred to be from 20 to 10,000 and more preferred to be from 50 to 1,000.

Treating methods for introducing a functional group such as mercapto group, amino group or nitrile group onto surface of a carbon nanotube have been known already. For example, there have been reported a method wherein reaction is carried out and introduction is done by means of covalent bond, a method wherein hydrophobic interaction and/or hydrogen bond are/is utilized, a method wherein π-stacking is utilized and a method wherein electrostatic interaction is utilized. In any of those methods, mercapto group, amino group or nitrile group can be introduced onto the surface of a carbon nanotube. In the method wherein π-stacking is utilized, an aromatic compound results in π-stacking with graphite structure in a carbon nanotube and is selectively adhered onto surface of the carbon nanotube. Accordingly, when an aromatic compound having mercapto group, amino group or nitrile group is used, it is possible to introduce mercapto group, amino group or nitrile group onto surface of a carbon nanotube. Examples of the aromatic compound having mercapto group are benzyl mercaptan, benzenethiol, triphenylmethanethiol, aminothiophenol, 2-phenylethanethiol and 2-mercapto-N-(2-naphthyl)acetamide. Examples of the aromatic compound having amino group are benzylamine, N-(1-naphthylmethyl)-amine and 1-(1-naphthyl)ethylamine. Examples of the aromatic compound having nitrile group are phenylacetonitrile and 1-naphthylacetonitrile.

To be more specific, when a carbon nanotube is dispersed in a solution of an aromatic compound having a group selected from mercapto group, amino group and nitrile group, using an ultrasonic treating machine or the like, then the aromatic compound having mercapto group, amino group or nitrile group adheres onto surface of the dispersed carbon nanotube and, when this dispersion is filtered, there is prepared a carbon nanotube having mercapto group, amino group or nitrile group on its surface.

The conductive material (B2) or, particularly, a carbon nanotube having a group selected from mercapto group, amino group and nitrile group on its surface has high affinity to metal particles and also has good affinity to the resin (A) which is the rubber (A1) containing sulfur atom and/or the rubber (A2) containing nitrile group whereby it is uniformly dispersed and forms an effective electrically conductive network together with the metal powder (B1). In addition, breakage of the electrically conductive network can be suppressed even upon being stretched whereby a decrease in electrical conductivity can be prevented.

The conductive material (B2) having a group selected from mercapto group, amino group and nitrile group on its surface and having an aspect ratio of from 10 to 10,000 is usually expensive and when it is compounded too much, a dispersion treatment becomes difficult. Therefore, the compounding amount of the conductive material (B2) in the solid content of the electrically conductive paste is 1 to 10% by volume and, preferably, it is 1.5 to 6% by volume.

As mentioned already, treating methods for introducing a functional group onto surface of a carbon nanotube have been known already. Therefore, when an aromatic compound having a functional group is used, it is possible to introduce the functional group onto the surface of a carbon nanotube. When the functional group introduced onto the surface of a carbon nanotube is made to react with a rubber having a reactive group, it is possible to adhere the rubber onto the surface of a carbon nanotube.

Examples of the reaction type are a combination of glycidyl group with carboxyl group, a combination of glycidyl group with amino group, a combination of isocyanate group with hydroxyl group and a combination of isocyanate group with amino group.

To be more specific, examples thereof are a method wherein a carbon nanotube having a glycidyl group-containing aromatic compound adhered onto surface thereof is made to react with an acrylonitrile butadiene oligomer having terminal amino group, a method wherein a carbon nanotube having a glycidyl group-containing aromatic compound adhered onto surface thereof is made to react with an acrylonitrile butadiene oligomer having terminal carboxyl group, a method wherein a carbon nanotube having a glycidyl group-containing aromatic compound adhered onto surface thereof is made to react with a polysulfide oligomer having terminal mercapto group, a method wherein a carbon nanotube having a carboxyl group-containing aromatic compound adhered onto surface thereof is made to react with an acrylonitrile butadiene oligomer having terminal glycidyl group and a method wherein a carbon nanotube having an amino group-containing aromatic compound adhered onto surface thereof is mace to react with an acrylonitrile butadiene oligomer having terminal glycidyl group.

Examples of the glycidyl group-containing aromatic compound are phenyl glycidyl ether, o-cresyl glycidyl ether, 1-(glycidyloxy)naphthalene and o-phenylphenyl glycidyl ether. Examples of the carboxyl group-containing aromatic compound are 1-naphthylacetic acid, 2-naphthylacetic acid and 2-naphthyloxyacetic acid. Examples of the amino group-containing aromatic compound are N-(1-naphthylmethyl)amine and 1-(1-napthyl)ethylamine.

As to the acrylonitrile butadiene oligomer having terminal amino group, there may be used Hypro™ ATBN polymer (manufactured by Emerald Performance Materials). As to the acrylonitrile butadiene oligomer having terminal carboxyl group, there may be used Hypro™ CTBN polymer (manufactured by Emerald Performance Materials). As to the acrylonitrile butadiene oligomer having terminal glycidyl group, there may be used Hypro™ ETBN polymer (manufactured by Emerald Performance Materials).

As to the polysulfide oligomer having terminal mercapto group, there may be used "Thiokol LP" (manufactured by Toray Fine Chemical).

To be more specific, when a carbon nanotube is dispersed in a solution of a compound having functional group using an ultrasonic treating machine or the like, the aromatic compound having functional group adheres onto surface of the dispersed carbon nanotube and, when this dispersion is filtered, there is prepared a carbon nanotube having functional group on its surface. The resulting carbon nanotube is dispersed once again in a solution of a terminal reactive rubber oligomer and the dispersion is made to react by heating to give a carbon nanotube wherein rubber is adhered onto the surface thereof.

The conductive material (B2) which is subjected to a surface treatment with a rubber having sulfide bond and/or nitrile group and has an aspect ratio of from 10 to 10,000 is usually expensive and, when it is compounded too much, a dispersion treatment becomes difficult. Therefore, the compounding amount of the conductive material (B2) in the solid content of the electrically conductive paste is preferably 1 to 10% by volume and, particularly preferably, 1.5 to 6% by volume.

As to the metal nanowire (B2), its specific examples are iron, cobalt, nickel, copper, zinc, ruthenium, rhodium, palladium, silver, cadmium, osmium, iridium, platinum and gold and, in view of the electrical conductivity, copper, silver, platinum and gold are preferred, and silver and copper are particularly preferred.

As to the shape of the metal nanowire (B2), there is no particular limitation as far as its aspect ratio is 10 or more. However, when the aspect ratio is too big, handling becomes difficult whereby the aspect ratio is 5,000 or less and preferred to be 1,500 or less.

Diameter of the metal nanowire (B2) is preferred to be 1 nm to 1 μm and more preferred to be 10 nm to 500 nm. Length of the metal nanowire (B2) is preferred to be 5 μm to 1 mm and more preferred to be 10 μm to 500 μm. When the length is too short, stretchability concerning electrical conductivity is inferior while, when it is too long, there is a possibility that handling becomes difficult and dispersion becomes difficult.

The metal nanowire (B2) can be produced by a known synthesis method. For example, it can be produced by a method wherein silver nitrate is reduced in a solvent, or by a polyol reduction method wherein reduction is carried out together with heating in ethylene glycol, or by a method wherein reduction is carried out in citric acid.

The metal nanowire (B2) forms an electrically conductive network together with the metal powder (B1). Due to its high aspect ratio, it has an action of preventing breakage of the electrically conductive network even upon being stretched. However, the metal nanowire (B2) is usually expensive and, when it is compounded too much, dispersion becomes difficult whereby it is preferred that the compounding amount is as little as possible. The amount in the solid content is 1 to 10% by volume and preferred to be 1.5 to 6% by volume.

The electrically conductive paste of the present invention may be further compounded with metal nanoparticles (B3) as a conductive filler for a purpose of enhancement of electrical conductivity, improvement in printing property, etc. Since the metal nanoparticles (B3) have a function of giving the electrical conductivity between electrically conductive networks, enhancement of the electrical conductivity can be expected thereby. It is also possible to compound it for a purpose of rheology adjustment of the electrically conductive paste in order to improve the printing property. An average particle diameter of the metal nanoparticles (B3) is preferred to be 2 to 100 nm. To be more specific, there are exemplified silver, bismuth, platinum, gold, nickel, tin, copper and zinc. In view of the electrical conductivity, copper, silver, platinum and gold are preferred and the particles which contain silver and/or copper as main ingredient(s) are particularly preferred.

Since the metal nanoparticles (B3) are usually expensive as well, it is preferred to be compounded as in small amount as possible. Compounding amount of the metal nanoparticles (B3) in the solid content of the electrically conductive paste is preferred to be 0.5 to 5% by volume.

An inorganic substance may be added to the electrically conductive paste of the present invention to the extent which does not deteriorate the electrical conductivity and the stretchability. As to the inorganic substance, there may be used various kinds of carbide such as silicon carbide, boron carbide, titanium carbide, zirconium carbide, hafnium carbide, vanadium carbide, tantalum carbide, niobium carbide, tungsten carbide, chromium carbide, molybdenum carbide, calcium carbide and diamond carbon lactam; various kinds of nitrides such as boron nitride, titanium nitride and zirconium nitride; various kinds of borates such as zirconium borate; various kinds of oxides such as titanium oxide (titania), calcium oxide, magnesium oxide, zinc oxide, copper oxide, aluminum oxide, silica and colloidal silica; various kinds of titanate compounds such as calcium titanate, magnesium titanate and strontium titanate; sulfides such as molybdenum disulfide; various kinds of fluorides such as magnesium fluoride and carbon fluoride; various kinds of metal soaps such as aluminum stearate, calcium stearate, zinc stearate and magnesium stearate; and others such as talcum, bentonite, talc, calcium carbonate, bentonite, kaolin, glass fiber and mica. When the inorganic substance as such is added, there may be the cases wherein printing property and heat resistance and, further, mechanical characteristics and durability for long time can be enhanced.

It is also possible to compound with thixotropic property imparting agent, antifoaming agent, flame retardant, tackifier, preventing agent for hydrolysis, leveling agent, plasticizer, antioxidant, ultraviolet absorber, flame retardant, pigment or dye.

As to an organic solvent used for the electrically conductive paste of the present invention, its boiling point is preferred to be from 100° C. to lower than 300° C. and more preferred to be from 150° C. to lower than 290° C. When the boiling point of the organic solvent is too low, the solvent is evaporated in a paste producing step or in actual use of the paste whereby there is such a risk that the ratio of the ingredients constituting the electrically conductive paste is apt to change. On the other hand, when the boiling point of the organic solvent is too high, there is a possibility that the solvent abundantly remains in the coat in case a low-temperature drying step is demanded (such as 150° C. or lower) and there is a risk of causing the lowering of reliability of the coat.

Examples of the high-boiling solvent as such are cyclohexanone, toluene, isophorone, γ-butyrolactone, benzyl alcohol, Solvesso 100, 150 and 200 (manufactured by Exxon Chemical), propylene glycol monomethyl ether acetate, terpineol, butyl glycol acetate, diamylbenzene (boiling point: 260 to 280° C.), triamylbenzene (boiling point: 300 to 320° C.), n-dodecanol (boiling point: 255 to 259° C.), diethylene glycol (boiling point: 245° C.), ethylene glycol monoethyl ether acetate (boiling point: 145° C.), diethylene glycol monoethyl ether acetate (boiling point: 217° C.), diethylene glycol monobutyl ether acetate (boiling point: 247° C.), diethylene glycol dibutyl ether (boiling point: 255° C.), diethylene glycol monoacetate (boiling point: 250° C.), triethylene glycol diacetate (boiling point: 300° C.), triethylene glycol (boiling point: 276° C.), triethylene glycol monomethyl ether (boiling point: 249° C.), triethylene glycol monoethyl ether (boiling point: 256° C.), triethylene glycol monobutyl ether (boiling point: 271° C.), tetraethylene glycol (boiling point: 327° C.), tetraethylene glycol monobutyl ether (boiling point: 304° C.), tripropylene glycol (boiling point: 267° C.), tripropylene glycol monomethyl ether (boiling point: 243° C.) and 2,2,4-trimethyl-1,3-pentanediol monoisobutyrate (boiling point: 253° C.), As to a petroleum hydrocarbon, there may be also exemplified AF Solvent No. 4 (boiling point: 240 to 265° C.), No. 5 (boiling point: 275 to 306° C.), No. 6 (boiling point: 296 to 317° C.), No. 7 (boiling point: 259 to 282° C.), and No. 0 Solvent H (boiling point: 245 to 265° C.) manufactured by Nippon Oil Corporation. Upon necessity, two or more thereof may be compounded. The organic solvent as such is appropriately compounded so that the electrically conductive paste becomes a viscosity which is suitable for printing, etc.

Amount of the organic solvent in the electrically conductive paste is determined, for example, by a dispersing method for a conductive filler and by viscosity of or a drying method for the electrically conductive paste suitable for a method of forming a conductive membrane. With regard to the electrically conductive paste of the present invention, it is possible that the conductive filler is uniformly dispersed in the resin by using a known method for dispersing powder into liquid. An example is that metal powder, a dispersion of a conductive material (metal nanowire) having high aspect ratio and a resin solution are mixed and then subjected to ultrasonic method, mixer method, three-roll mill method, ball mill method or the like whereby uniform dispersion can be achieved. With regard to those means, it is also possible that two or more thereof may be combined and used.

When the electrically conductive paste of the present invention is applied to or printed on a substrate to form a coat and then an organic solvent in the coat is evaporated and dried, an electrically conductive membrane or an electrically conductive pattern can be formed.

Although there is no particular limitation for the substrate to which the electrically conductive paste is applied, a substrate having flexibility or stretchability is preferred depending upon the use so as to make the best use of stretchability of the conductive membrane. Examples of the flexible substrate are paper, fabric, polyethylene terephthalate, polyvinyl chloride, polyethylene and polyimide. Examples of the stretchable substrate are polyurethane, polydimethylsiloxane (PDMS), nitrile rubber, butadiene rubber, SBS elastomer and SEBS elastomer. It is preferred that the substrate as such can be creased and is stretchable in its planar direction. In view of such a point, a substrate comprising rubber or elastomer is preferred. The use of fabric as a substrate is a preferred embodiment and, although textile (cloth) may be used as a substrate, it is more preferred to use a knitted product (knit) as a substrate in view of its ability to impart stretchability.

A step for applying the electrically conductive paste onto the substrate is not particularly limited and it may be carried out, for example, by means of a coating method, a printing method or a transfer method. As to the printing method, examples thereof are a screen printing method, a lithographic offset printing method, an ink jet method, a flexographic printing method, a gravure printing method, a gravure offset printing method, a stamping method, a dispensing method and a squeegee printing.

A step for heating the substrate applied with the electrically conductive paste may be carried out under ambient air, under vacuum atmosphere, under inert gas atmosphere, under reductive gas atmosphere, etc. Heating temperature is within a temperature range of 20 to 200° C. and is selected by taking the demanded electrical conductivity, the heat resistance of a substrate, etc. into consideration. By the heating, an organic solvent is evaporated and, in some cases, a curing reaction proceeds under heating whereby electrical conductivity, close adhesive property and surface hardness of the electrically conductive membrane after the drying become good.

Stretching rate necessary for the stretchable electrically conductive membrane varies depending upon the actual use and is not particularly limited. In the use such as wiring, antenna, electrode, etc. in the presumed field of healthcare, display, solar cell, PFID, etc., a stretching rate of 5% to about 80% is demanded. In a stretchable electrically conductive membrane prepared by applying or printing the electrically conductive paste of the present invention, the specific resistance upon being stretched, for example, to an extent of 80% is demanded to be 10-fold or less, preferably 5-fold or less, and more preferably 2-fold or less, as compared with the specific resistance in the natural state (upon stretching of 0%). Changes in the electrical conductivity when an operation wherein the conductive membrane is stretched to a predetermined rate followed by returning to the zero stress state is repeated are also important. For example, the specific resistance after a 10% stretching is repeated for 1000 times is preferred to be 10-fold or less and more preferred to be 5-fold or less as compared with the specific resistance in the natural state (upon stretching of 0%).

EXAMPLES

The present invention will now be specifically illustrated by way of the following Examples and Comparative Examples although the present invention is not limited thereto.

(Preparation of Carbon Nanotube Having Mercapto Group on its Surface)

A multi-wall carbon nanotube (SWeNT MW100, manufactured by SouthWest Nano Technologies; diameter: 6 to 9 nm; length: 5 µm; aspect ratio: 556 to 833) (50 mg) was added to 100 ml of 0.006 mol/l ethanolic solution of 2-mercapto-N-(2-naphthyl)acetamide and subjected to an ultrasonic treatment for 30 minutes. After filtering through a PTFE membrane, washing with ethanol was carried out for several times followed by drying to prepare a carbon nanotube (CNT-A) having mercapto group on its surface.

(Preparation of Carbon Nanotube Having Amino Group on its Surface)

The same operation as for CNT-A was carried out except that N-(1-naphthylmethyl)amine was used instead of 2-mercapto-N-(2-naphthyl)acetamide to prepare a carbon nanotube (CNT-B) having amino group on its surface.

(Preparation of Carbon Nanotube Having Nitrile Group on its Surface)

The same operation as for CNT-A was carried out except that 1-naphthylacetonitrile was used instead of 2-mercapto-N-(2-naphthyl)acetamide to prepare a carbon nanotube (CNT-C) having nitrile group on its surface.

Examples 1A to 10A and Comparative Examples 1A to 6A

Resin was dissolved in diethylene glycol monomethyl ether acetate to prepare a solution. With this solution, a liquid wherein silver particles (and silver nanoparticles if necessary) and an untreated carbon nanotube (untreated CNT) or a carbon nanotube (CNT-A to C) subjected to a surface treatment were uniformly dispersed was compounded so that each ingredient became the volume % in the solid content as mentioned in Tables 1 and 2, and was then kneaded using a three-roll mill to give an electrically conductive paste. The resulting paste was made into a membrane on a glass plate by a drop cast method and dried at 150° C. for 30 minutes to prepare an electrically conductive membrane in a sheet form of 100 μm thickness. Specific resistances of the electrically conductive membrane when the stretching rates were 0%, 20%, 50% and 80% were evaluated according to the method which will be mentioned later. Changing rate of specific resistance of the electrically conductive membrane after repeating a 10% stretching for 1,000 times was also evaluated. Compositions of electrically conductive pastes of Examples 1A to 10A and Comparative Examples 1A to 6A were mentioned in Tables 1 and 2 together with the evaluated results thereof.

Example 11A

The electrically conductive paste prepared in Example 1A was made into a membrane on a 2 WAY knitted fabric by a drop cast method and dried at 120° C. for 30 minutes to prepare an electrically conductive laminate wherein the electrically conductive membrane in a sheet form of 100 μm thickness was laminated on the fabric. When this electrically conductive laminate was evaluated by naked eye, a uniform electrically conductive membrane having no defect such as crack was formed and detachment thereof from the substrate was not observed as well.

TABLE 1

|  |  | Example 1A | Example 2A | Example 3A | Example 4A | Example 5A | Example 6A | Example 7A | Example 8A |
|---|---|---|---|---|---|---|---|---|---|
| Conductive filler (B) | silver particle[1] | 30 | 30 | 30 | 27 | 35 | 30 | 30 | 30 |
|  | CNT-A[2] | 3 |  |  | 3 | 3 | 3 | 3 | 3 |
|  | CNT-B[3] |  | 3 |  |  |  |  |  |  |
|  | CNT-C[4] |  |  | 3 |  |  |  |  |  |
|  | untreated CNT[5] |  |  |  |  |  |  |  |  |
|  | silver nanoparticle[6] |  |  |  |  |  |  |  | 3 |
| Resin (A) | nitrile group-containing rubber A[7] | 67 | 67 | 67 | 70 | 62 |  |  | 64 |
|  | nitrile group-containing rubber B[8] |  |  |  |  |  | 67 |  |  |
|  | sulfur-containing rubber[9] |  |  |  |  |  |  | 67 |  |
|  | polyester[10] |  |  |  |  |  |  |  |  |
| Specific resistance (×10$^{-5}$ Ωcm) | stretching rate 0% | 7.5 | 8.2 | 7.4 | 9.9 | 3.8 | 8.2 | 8.5 | 7.0 |
|  | stretching rate 20% | 7.0 | 8.5 | 7.0 | 10.1 | 3.5 | 8.8 | 8.2 | 6.8 |
|  | stretching rate 50% | 7.7 | 8.6 | 7.5 | 10.0 | 4.0 | 8.5 | 8.1 | 7.2 |
|  | stretching rate 80% | 8.0 | 9.2 | 7.9 | 10.0 | 8.2 | 8.9 | 8.4 | 7.6 |
| Changing rate of specific resistance after repeated 10% stretching (for 1000 times) (%) |  | 330 | 380 | 350 | 250 | 650 | 400 | 390 | 350 |

TABLE 2

|  |  | Example 9A | Example 10A | Comparative Example 1A | Comparative Example 2A | Comparative Example 3A | Comparative Example 4A | Comparative Example 5A | Comparative Example 6A |
|---|---|---|---|---|---|---|---|---|---|
| Conductive filler (B) | silver particle[1] | 30 | 30 | 30 | 30 |  | 15 | 55 | 30 |
|  | CNT-A[2] | 2 | 5 |  |  | 3 | 3 | 3 | 3 |
|  | CNT-B[3] |  |  |  |  |  |  |  |  |
|  | CNT-C[4] |  |  |  |  |  |  |  |  |
|  | untreated CNT[5] |  |  |  | 3 |  |  |  |  |
|  | silver nanoparticle[6] |  |  |  |  |  |  |  |  |
| Resin (A) | nitrile group-containing rubber A[7] | 68 | 65 | 70 | 67 | 97 | 82 | 42 |  |
|  | nitrile group-containing rubber B[8] |  |  |  |  |  |  |  |  |
|  | sulfur-containing rubber[9] |  |  |  |  |  |  |  |  |
|  | polyester[10] |  |  |  |  |  |  |  | 67 |
| Specific resistance (×10$^{-5}$ Ωcm) | stretching rate 0% | 8.2 | 5.5 | 18 | 13 | >10000 | >10000 | 2.3 | 6.2 |
|  | stretching rate 20% | 8.5 | 5.6 | 19 | 14 | >10000 | >10000 | breakage | breakage |
|  | stretching rate 50% | 8.0 | 5.8 | 20 | 15 | >10000 | >10000 | breakage | breakage |
|  | stretching rate 80% | 8.8 | 6.8 | 65 | 20 | >10000 | >10000 | breakage | breakage |
| Changing rate of specific resistance after repeated 10% stretching (for 1000 times) (%) |  | 400 | 320 | 2300 | 720 | — | — | — | — |

Details of 1) to 10) in Tables 1 and 2 are as follows.

1) Silver particle: Aggregated silver powder G-35 (average particle diameter: 5.9 μm; manufactured by DOWA Electronics)

2) Carbon nanotube having mercapto group on its surface

3) Carbon nanotube having amino group on its surface

4) Carbon nanotube having nitrile group on its surface

5) Untreated CNT: SWeNT MW100 (multi-wall carbon nanotube; diameter: 6 to 9 nm; length: 5 μm; aspect ratio: 556 to 833; manufactured by SouthWest Nano Technologies)

6) Silver nanoparticle: Silver nanoparticle dry powder 2 (average particle diameter: 60 nm; manufactured by DOWA Electronics)

7) Nitrile group-containing rubber A: Nipol 1042 (content of acrylonitrile: 33.3% by weight; manufactured by Nippon Zeon)

8) Nitrile group-containing rubber B: Nipol 1043 (content of acrylonitrile: 29.0% by weight; manufactured by Nippon Zeon)

9) Sulfur-containing rubber: Thiokol LP-23 (content of sulfur: 21.5% by weight; manufactured by Toray Fine Chemical)

10) Polyester: Vylon RV 630 (manufactured by Toyobo)

Methods for evaluating the electrically conductive membranes of Examples 1A to 10A and Comparative Examples 1A to 6A are as follows.

[Evaluation of Specific Resistance]

Sheet resistance and membrane thickness of an electrically conductive membrane test piece in a natural state (stretching rate: 0%) were measured to calculate the specific resistance. Specifically, membrane thickness and sheet resistance were measured for four test pieces using a thickness gauge SMD-565L (manufactured by TECLOCK) and Loresta-GP MCP-T610 (manufactured by Mitsubishi Chemical Analytic), respectively and mean values thereof were used.

According to the same manner as in the natural state (stretching rate: 0%), specific resistances when the stretching rates were 20%, 50% and 80% were measured. Stretching rate was calculated according to the following formula.

Stretching rate (%)=($\Delta L_0/L_0$)×100

In the formula, $L_0$ is a distance between marked lines of a test piece and $\Delta L_0$ is an increase in the distance between marked lines of a test piece.

Specific resistance after a 10% stretching was repeated for 1000 times was also measured. Changing rate of the specific resistance was calculated according to the following formula.

Changing rate of the specific resistance=($R_{1000}-R_3$)/ $R$×100(%)

In the formula, $R_{1000}$ is the specific resistance after repeating a 10% stretching for 1000 times and $R_0$ is the specific resistance in a natural state.

As will be apparent from the results of Tables 1 and 2, the electrically conductive pastes of Examples 1A to 10A can maintain not only good electrical conductivity in a natural state but also high electrical conductivity even upon being stretched and, even after the repeated stretching, lowering in the electrical conductivity is small. On the contrary, the electrically conductive pastes of Comparative Examples 1A to 6A show high specific resistance as compared with Examples 1A to 10A or result in breakage by stretching whereby electrical conductivity lowers by a repeated stretching.

(Preparation of Carbon Nanotube Having Acrylonitrile Butadiene Oligomer on its Surface)

A multi-wall carbon nanotube (SWeNT MW 100, manufactured by SouthWest Nano Technologies; diameter: 6 to 9 nm; length: 5 μm; aspect ratio: 556 to 833) (50 mg) was added to 100 ml of 0.006 mol/l ethanolic solution of o-phenylphenyl glycidyl ether and subjected to an ultrasonic treatment for 30 minutes. After filtering through a PTFE membrane, washing with ethanol was carried out for several times followed by drying to prepare a carbon nanotube having glycidyl group on its surface.

After that, the carbon nanotube was added to a solution of Hypro™ 1300×16ATBN which is an acrylonitrile butadiene oligomer having terminal amino group (content of acrylonitrile: 18% by weight; amine equivalent: 900; manufactured by Emerald Performance Materials) in tetrahydrofuran and subjected to a dispersion treatment for 30 minutes using an ultrasonic treating machine. It was further heated at 60° C., subjected to an ultrasonic treatment for 1 hour, filtered through a PTFE membrane, washed for several times with tetrahydrofuran and dried to prepare a carbon nanotube (CNT-A) having an acrylonitrile butadiene oligomer on its surface.

(Preparation of Carbon Nanotube Having Acrylonitrile Butadiene Oligomer on its Surface)

The same operation as for CNT-A was carried out except that Hypro™ 1300×8CTBN which is an acrylonitrile butadiene oligomer having terminal carboxyl group (content of acrylonitrile: 18% by weight; acid value: 29; molecular weight: 3550; manufactured by Emerald Performance Materials) was used instead of Hypro™ 1300×16ATBN which is an acrylonitrile butadiene oligomer having terminal amino group to prepare a carbon nanotube (CNT-B) having acrylonitrile butadiene oligomer on its surface.

(Preparation of Carbon Nanotube Having Polysulfide Oligomer on its Surface)

The same operation as for CNT-A was carried out except that Thiokol LP-3 which is a polysulfide oligomer having terminal mercapto group (content of mercapto: 6.8% by weight; manufactured by Toray Fine Chemical) was used instead of Hypro™ 1300×16ATBN which is an acrylonitrile butadiene oligomer having terminal amino group to prepare a carbon nanotube (CNT-C) having polysulfide oligomer on its surface.

Examples 1B to 10B and Comparative Examples 1B to 6B

Resin was dissolved in diethylene glycol monomethyl ether acetate to prepare a solution. With this solution, a liquid wherein silver particles (and silver nanoparticles if necessary) and an untreated carbon nanotube (untreated CNT) or a carbon nanotube (CNT-A to C) subjected to a surface treatment were uniformly dispersed was compounded so that each ingredient became the volume % in the solid content as mentioned in Tables 3 and 4, and was then kneaded using a three-roll mill to give an electrically conductive paste. The resulting paste was made into a membrane on a glass plate by a drop cast method and dried at 150° C. for 30 minutes to prepare an electrically conductive membrane in a sheet form of 100 μm thickness. Specific resistances of the electrically conductive membrane when the stretching rates were 0%, 20%, 50% and 80% were evaluated according to the method which will be mentioned later. Changing rate of specific resistance of the electrically conductive membrane after repeating a 10% stretching for 1,000 times was also evaluated. Compositions of electrically conductive pastes of Examples 1B to 10B and Comparative Examples 1B to 6B were mentioned in Tables 3 and 4 together with the evaluated results thereof.

Example 11B

The electrically conductive paste prepared in Example 1B was made into a membrane on a Teflon (registered trademark) sheet by a drop cast method and laminated with a 2 way knitted fabric. After being dried at 120° C. for 30 minutes, the Teflon (registered trademark) sheet was detached to prepare an electrically conductive laminate wherein the electrically conductive membrane in a sheet form of 100 μm thickness was laminated on the fabric. When this electrically conductive laminate was evaluated by naked eye, a uniform electrically conductive membrane having no defect such as crack was formed and detachment thereof from the substrate was not observed as well.

Details of 1) to 10) in Tables 3 and 4 are as follows.

1) Silver particle A: Aggregated silver powder G-35 (average particle diameter: 5.9 μm; manufactured by DOWA Electronics)

2) Carbon nanotube having acrylonitrile butadiene oligomer on its surface

3) Carbon nanotube having acrylonitrile butadiene oligomer on its surface

4) Carbon nanotube having polysulfide oligomer on its surface

5) Untreated CNT: SWeNT MW100 (multi-wall carbon nanotube; diameter: 6 to 9 nm; length: 5 μm; aspect ratio: 556 to 833; manufactured by SouthWest Nano Technologies)

6) Silver nanoparticle: Silver nanoparticle dry powder 2 (average particle diameter: 60 nm; manufactured by DOWA Electronics)

TABLE 3

| | | Example 1B | Example 2B | Example 3B | Example 4B | Example 5B | Example 6B | Example 7B | Example 8B |
|---|---|---|---|---|---|---|---|---|---|
| Conductive filler (B) | silver particle[1] | 30 | 30 | 30 | 27 | 35 | 30 | 30 | 30 |
| | CNT-A[2] | 3 | | | 3 | 3 | 3 | 3 | 3 |
| | CNT-B[3] | | 3 | | | | | | |
| | CNT-C[4] | | | 3 | | | | | |
| | untreated CNT[5] | | | | | | | | |
| | silver nanoparticle[6] | | | | | | | | 3 |
| Resin (A) | nitrile group-containing rubber A[7] | 67 | 67 | 67 | 70 | 62 | | | 64 |
| | nitrile group-containing rubber B[8] | | | | | | 67 | | |
| | sulfur-containing rubber[9] | | | | | | | 67 | |
| | polyester[10] | | | | | | | | |
| Specific resistance ($\times 10^{-5}$ Ωcm) | stretching rate 0% | 7.0 | 7.1 | 8.0 | 9.5 | 3.5 | 8.0 | 8.2 | 6.5 |
| | stretching rate 20% | 7.3 | 7.2 | 8.5 | 9.8 | 3.8 | 8.4 | 8.5 | 6.7 |
| | stretching rate 50% | 7.2 | 7.2 | 8.2 | 9.9 | 4.0 | 8.5 | 8.3 | 6.8 |
| | stretching rate 80% | 7.9 | 7.5 | 8.7 | 9.8 | 8.2 | 8.8 | 8.5 | 7.1 |
| Changing rate of specific resistance after repeated 10% stretching (for 1000 times) (%) | | 310 | 350 | 370 | 230 | 610 | 330 | 380 | 320 |

TABLE 4

| | | Example 9B | Example 10B | Comparative Example 1B | Comparative Example 2B | Comparative Example 3B | Comparative Example 4B | Comparative Example 5B | Comparative Example 6B |
|---|---|---|---|---|---|---|---|---|---|
| Conductive filler (B) | silver particle[1] | 30 | 30 | 30 | 30 | | 15 | 55 | 30 |
| | CNT-A[2] | 2 | 5 | | | 3 | 3 | 3 | 3 |
| | CNT-B[3] | | | | | | | | |
| | CNT-C[4] | | | | | | | | |
| | untreated CNT[5] | | | | 3 | | | | |
| | silver nanoparticle[6] | | | | | | | | |
| Resin (A) | nitrile group-containing rubber A[7] | 68 | 65 | 70 | 67 | 97 | 82 | 42 | |
| | nitrile group-containing rubber B[8] | | | | | | | | |
| | sulfur-containing rubber[9] | | | | | | | | |
| | polyester[10] | | | | | | | | 67 |
| Specific resistance ($\times 10^{-5}$ Ωcm) | stretching rate 0% | 8.0 | 5.0 | 18 | 13 | >10000 | >10000 | 3.2 | 10.2 |
| | stretching rate 20% | 8.2 | 5.5 | 19 | 15 | >10000 | >10000 | breakage | breakage |
| | stretching rate 50% | 8.3 | 5.3 | 20 | 14 | >10000 | >10000 | breakage | breakage |
| | stretching rate 80% | 8.9 | 6.3 | 53 | 22 | >10000 | >10000 | breakage | breakage |
| Changing rate of specific resistance after repeated 10% stretching (for 1000 times) (%) | | 390 | 310 | 1900 | 720 | — | — | — | — |

7) Nitrile group-containing rubber A: Nipol 1042 (content of acrylonitrile: 33.3% by weight; manufactured by Nippon Zeon)

8) Nitrile group-containing rubber B: Nipol 1043 (content of acrylonitrile: 29.0% by weight; manufactured by Nippon Zeon)

9) Sulfur-containing rubber: Thiokol LP-23 (content of sulfur: 21.5% by weight; manufactured by Toray Fine Chemical)

10) Polyester: Vylon RV 630 (manufactured by Toyobo)

Methods for evaluating the electrically conductive membranes of Examples 1B to 10B and Comparative Examples 1B to 6B are as follows.

[Evaluation of Specific Resistance]

Sheet resistance and membrane thickness of an electrically conductive membrane test piece in a natural state (stretching rate: 0%) were measured to calculate the specific resistance. Specifically, membrane thickness and sheet resistance were measured for four test pieces using a thickness gauge SMD-565L (manufactured by TECLOCK) and Loresta-GP MCP-T610 (manufactured by Mitsubishi Chemical Analytic), respectively and mean values thereof were used.

According to the same manner as in the natural state (stretching rate: 0%), specific resistances when the stretching rates were 20%, 50% and 80% were measured. Stretching rate was calculated according to the following formula.

Stretching rate (%)=($\Delta L_0/L_0$)×100

In the formula, $L_0$ is a distance between marked lines of a test piece and $\Delta L_0$ is an increase in the distance between marked lines of a test piece.

Specific resistance after a 10% stretching was repeated for 1000 times was also measured. Changing rate of the specific resistance was calculated according to the following formula.

Changing rate of the specific resistance=($R_{1000}-R_0$)/$R_0$×100(%)

In the formula, $R_{1000}$ is the specific resistance after repeating a 10% stretching for 1000 times and $R_0$ is the specific resistance in a natural state.

As will be apparent from the results of Tables 3 and 4, the electrically conductive pastes of Examples 1B to 10B can maintain not only good electrical conductivity in a natural state but also high electrical conductivity even upon being stretched and, even after the repeated stretching, lowering in the electrical conductivity is small. On the contrary, the electrically conductive pastes of Comparative Examples 1B to 6B show high specific resistance as compared with Examples 1B to 10B or result in breakage by stretching whereby electrical conductivity lowers by a repeated stretching.

Examples 1C to 10C and Comparative Examples 1C to 6C

Resin was dissolved in diethylene glycol monomethyl ether acetate to prepare a solution. With this solution, an isopropanol solution wherein silver particles (and silver nanoparticles if necessary) and silver nanowire were uniformly dispersed was compounded so that each ingredient became the volume % in the solid content as mentioned in Tables 5 and 6, and was then kneaded using a three-roll mill to give an electrically conductive paste. The resulting paste was made into a membrane on a glass plate by a drop cast method and dried at 150° C. for 30 minutes to prepare an electrically conductive membrane in a sheet form of 100 μm thickness. Specific resistances of the electrically conductive membrane when the stretching rates were 0%, 20%, 50% and 80% were evaluated according to the method which will be mentioned later. Changing rate of specific resistance of the electrically conductive membrane after repeating a 10% stretching for 1,000 times was also evaluated. Compositions of electrically conductive pastes of Examples 1C to 10C and Comparative Examples 1C to 6C were mentioned in Tables 5 and 6 together with the evaluated results thereof.

Example 11C

The electrically conductive paste prepared in Example 1C was made into a membrane on a Teflon (registered trademark) sheet by a drop cast method and laminated with a tubular knitted fabric. After being dried at 120° C. for 30 minutes, the Teflon (registered trademark) sheet was detached to prepare an electrically conductive laminate wherein the electrically conductive membrane in a sheet form of 100 μm thickness was laminated on the fabric. When this electrically conductive laminate was evaluated by naked eye, a uniform electrically conductive membrane having no defect such as crack was formed and detachment thereof from the substrate was not observed as well.

TABLE 5

| | | Example 1C | Example 2C | Example 3C | Example 4C | Example 5C | Example 6C | Example 7C | Example 8C |
|---|---|---|---|---|---|---|---|---|---|
| Conductive filler (B) | silver particle[1] | 30 | | | 27 | 35 | 30 | 30 | 30 |
| | silver particle[2] | | 30 | | | | | | |
| | silver particle[3] | | | 30 | | | | | |
| | silver nanowire[4] | 3 | 3 | 3 | 3 | 3 | 3 | 3 | 3 |
| | silver nanoparticle[5] | | | | | | | | 3 |
| Resin (A) | nitrile group-containing rubber A[6] | | | | | | 37 | | |
| | nitrile group-containing rubber B[7] | | | | | | | 37 | |
| | sulfur-containing rubber[8] | 67 | 67 | 67 | 70 | 62 | 30 | 30 | 64 |
| | polyester[9] | | | | | | | | |

TABLE 5-continued

| | | Example 1C | Example 2C | Example 3C | Example 4C | Example 5C | Example 6C | Example 7C | Example 8C |
|---|---|---|---|---|---|---|---|---|---|
| Specific resistance ($\times 10^{-5}$ Ωcm) | stretching rate 0% | 8.0 | 7.3 | 8.2 | 9.8 | 4.2 | 7.2 | 8.0 | 7.0 |
| | stretching rate 20% | 8.3 | 7.6 | 7.8 | 9.5 | 5.0 | 6.8 | 8.2 | 7.2 |
| | stretching rate 50% | 7.7 | 7.7 | 7.9 | 9.9 | 5.7 | 7.3 | 7.9 | 7.3 |
| | stretching rate 80% | 8.2 | 7.8 | 8.3 | 10.1 | 5.8 | 7.4 | 8.1 | 7.5 |
| Changing rate of specific resistance after repeated 10% stretching (for 1000 times) (%) | | 340 | 370 | 340 | 240 | 600 | 380 | 410 | 330 |

TABLE 6

| | | Example 9C | Example 10C | Comparative Example 1C | Comparative Example 2C | Comparative Example 3C | Comparative Example 4C | Comparative Example 5C | Comparative Example 6C |
|---|---|---|---|---|---|---|---|---|---|
| Conductive filler (B) | silver particle[1] | 30 | 30 | 23 | 43 | 30 | 30 | 30 | 30 |
| | silver particle[2] | | | | | | | | |
| | silver particle[3] | | | | | | | | |
| | silver nanowire[4] | 2 | 5 | 3 | 3 | | | 3 | 3 |
| | silver nanoparticle[5] | | | | | | 3 | | 3 |
| Resin (A) | nitrile group-containing rubber A[6] | 38 | 35 | | | | | | |
| | nitrile group-containing rubber B[7] | | | | | | | | |
| | sulfur-containing rubber[8] | 30 | 30 | 74 | 54 | 70 | 67 | | |
| | polyester[9] | | | | | | | 67 | 64 |
| Specific resistance ($\times 10^{-5}$ Ωcm) | stretching rate 0% | 9.0 | 6.0 | 3620 | 3.0 | 18 | 14 | 7.3 | 4.2 |
| | stretching rate 20% | 9.2 | 6.2 | 3500 | 5.2 | 19 | 13 | breakage | breakage |
| | stretching rate 50% | 8.9 | 6.5 | 3410 | breakage | 20 | 16 | breakage | breakage |
| | stretching rate 80% | 9.2 | 6.5 | 3700 | breakage | 50 | 32 | breakage | breakage |
| Changing rate of specific resistance after repeated 10% stretching (for 1000 times) (%) | | 420 | 340 | 210 | 1200 | 1800 | 1350 | — | — |

Details of 1) to 9) in Tables 5 and 6 are as follows.

1) Silver particle A: Aggregated silver powder G-35 (average particle diameter: 5.9 μm; manufactured by DOWA Electronics)

2) Silver particles B: Flaky silver powder FA-D-7 (average particle diameter: 3 μm; manufactured by DOWA Electronics)

3) Silver particles C: Spherical silver powder AG5-7F (average particle diameter: 3 μm; manufactured by DOWA Electronics)

4) Silver nanowire: NanoMeet NM-SNW70 (diameter: 70 nm; length: 20 to 80 μm; aspect ratio: 286 to 1143; 2.5% by weight isopropanol dispersion; manufactured by Beijing NanoMeet Technology)

5) Silver nanoparticle: Silver nanoparticle dry powder 2 (average particle diameter: 60 nm; manufactured by DOWA Electronics)

6) Nitrile group-containing rubber A: Nipol 1042 (content of acrylonitrile: 33.3% by weight; manufactured by Nippon Zeon)

7) Nitrile group-containing rubber B: Nipol 1043 (content of acrylonitrile: 29.0% by weight; manufactured by Nippon Zeon)

8) Sulfur-containing rubber: Thiokol LP-23 (content of sulfur: 21.5% by weight; manufactured by Toray Fine Chemical)

9) Polyester: Vylon RV 630 (manufactured by Toyobo)

Methods for evaluating the electrically conductive membranes of Examples 1C to 10C and Comparative Examples 1C to 6C are as follows.

[Evaluation of Specific Resistance]

Sheet resistance and membrane thickness of an electrically conductive membrane test piece in a natural state (stretching rate: 0%) were measured to calculate the specific resistance. Specifically, membrane thickness and sheet resistance were measured for four test pieces using a thickness gauge SMD-565L (manufactured by TECLOCK) and Loresta-GP MCP-T610 (manufactured by Mitsubishi Chemical Analytic), respectively and mean values thereof were used.

According to the same manner as in the natural state (stretching rate: 0%), specific resistances when the stretching rates were 20%, 50% and 80% were measured. Stretching rate was calculated according to the following formula.

Stretching rate (%) = $(\Delta L_0/L_0) \times 100$

In the formula, $L_0$ is a distance between marked lines of a test piece and $\Delta L_0$ is an increase in the distance between marked lines of a test piece.

Specific resistance after a 10% stretching was repeated for 1000 times was also measured. Changing rate of the specific resistance was calculated according to the following formula.

Changing rate of the specific resistance = $(R_{1000} - R_0)/R_0 \times 100$ (%)

In the formula, $R_{1000}$ is the specific resistance after repeating a 10% stretching for 1000 times and $R_0$ is the specific resistance in a natural state.

As will be apparent from the results of Tables 5 and 6, the electrically conductive pastes of Examples 1C to 1° C. can maintain not only good electrical conductivity in a natural state but also high electrical conductivity even upon being stretched and, even after the repeated stretching, lowering in the electrical conductivity is small. On the contrary, the electrically conductive pastes of Comparative Examples 1C to 6C show high specific resistance as compared with Examples 1C to 10C or result in breakage by stretching whereby electrical conductivity lowers by a repeated stretching.

INDUSTRIAL APPLICABILITY

Since the electrically conductive paste of the present invention has high electrical conductivity and stretchability, it can be advantageously used as electrodes, wirings, etc. for flexible displays, stretchable LED arrays, stretchable solar cells, stretchable antennas, stretchable batteries, actuators, healthcare devices or medical sensors, wearable computers, etc. wherein rubber or elastomer material is utilized.

The invention claimed is:

1. An electrically conductive paste wherein a conductive filler (B) is uniformly dispersed in a resin (A), characterized in that the resin (A) is a rubber (A1) containing sulfur atom and/or a rubber (A2) containing nitrile group, that the conductive filler (B) is metal powder (B1) having an average particle diameter of 0.5 to 10 μm and a conductive material (B2) having a group selected from mercapto group, amino group and nitrile group on its surface and having an aspect ratio of 10 to 10,000, and that compounding amounts of the resin (A), the metal powder (B1) and the conductive material (B2) in the solid content of the electrically conductive paste are 50 to 80% by volume, 19 to 49% by volume and 1 to 10% by volume, respectively.

2. An electrically conductive paste wherein a conductive filler (B) is uniformly dispersed in a resin (A), characterized in that the resin (A) is a rubber (A1) containing sulfur atom and/or a rubber (A2) containing nitrile group, that the conductive filler (B) is metal powder (B1) having an average particle diameter of 0.5 to 10 μm and a conductive material (B2) having been subjected to a surface treatment with a rubber containing sulfide bond and/or nitrile group and having an aspect ratio of 10 to 10,000, and that compounding amounts of the resin (A), the metal powder (B1) and the conductive material (B2) in the solid content of the electrically conductive paste are 50 to 80% by volume, 19 to 49% by volume and 1 to 10% by volume, respectively.

3. An electrically conductive paste wherein a conductive filler (B) is uniformly dispersed in a resin (A), characterized in that the resin (A) is a rubber (A1) containing sulfur atom and/or a rubber (A2) containing nitrile group, that the conductive filler (B) is metal powder (B1) having an average particle diameter of 0.5 to 10 μm and a metal nanowire (B2) having an aspect ratio of 10 to 5,000, and that compounding amounts of the resin (A), the metal powder (B1) and the metal nanowire (B2) in the solid content of the electrically conductive paste are 50 to 80% by volume, 19 to 49% by volume and 1 to 10% by volume, respectively,
wherein the rubber (A1) containing sulfur atom is selected from polysulfide rubber, polyether rubber, polyacrylate rubber or silicone rubber containing mercapto group, sulfide bond or disulfide bond, and the rubber (A2) containing nitrile group is a rubber of a copolymer of acrylonitrile with butadiene.

4. The electrically conductive paste according to claim 1, wherein the rubber (A1) containing sulfur atom is selected from polysulfide rubber, polyether rubber, polyacrylate rubber or silicone rubber containing mercapto group, sulfide bond or disulfide bond.

5. The electrically conductive paste according to claim 2, wherein the rubber (A1) containing sulfur atom is selected from polysulfide rubber, polyether rubber, polyacrylate rubber or silicone rubber containing mercapto group, sulfide bond or disulfide bond.

6. The electrically conductive paste according to claim 1, wherein the rubber (A2) containing nitrile group is a rubber of a copolymer of acrylonitrile with butadiene.

7. The electrically conductive paste according to claim 2, wherein the rubber (A2) containing nitrile group is a rubber of a copolymer of acrylonitrile with butadiene.

8. The electrically conductive paste according to claim 1, wherein the metal powder (B1) is flaky metal powder, spherical metal powder or aggregated metal powder.

9. The electrically conductive paste according to claim 2, wherein the metal powder (B1) is flaky metal powder, spherical metal powder or aggregated metal powder.

10. The electrically conductive paste according to claim 3, wherein the metal powder (B1) is flaky metal powder, spherical metal powder or aggregated metal powder.

11. The electrically conductive paste according to claim 1, wherein the conductive material (B2) is a carbon nanotube which has been subjected to a surface treatment with an aromatic compound containing mercapto group, amino group or nitrile group.

12. The electrically conductive paste according to claim 2, wherein the conductive material (B2) is a carbon nanotube which has been subjected to a surface treatment with a rubber containing sulfide bond and/or nitrile group.

13. The electrically conductive paste according to claim 1, wherein the paste further contains metal nanoparticles (B3) having an average particle diameter of 2 to 100 nm as the conductive filler.

14. The electrically conductive paste according to claim 2, wherein the paste further contains metal nanoparticles (B3) having an average particle diameter of 2 to 100 nm as the conductive filler.

15. The electrically conductive paste according to claim 3, wherein the paste further contains metal nanoparticles (B3) having an average particle diameter of 2 to 100 nm as the conductive filler.

16. The electrically conductive paste according to claim 13, wherein the metal powder (B1) and the metal nanoparticles (B3) contain silver and/or copper as main ingredients.

17. The electrically conductive paste according to claim 14, wherein the metal powder (B1) and the metal nanoparticles (B3) contain silver and/or copper as main ingredients.

18. The electrically conductive paste according to claim 15, wherein the metal powder (B1) and the metal nanoparticles (B3) contain silver and/or copper as main ingredients.

19. An electrically conductive membrane or an electrically conductive pattern, characterized in that it is prepared by using the electrically conductive paste mentioned in claim 1.

20. An electrically conductive membrane or an electrically conductive pattern, characterized in that it is prepared by using the electrically conductive paste mentioned in claim 2.

21. An electrically conductive membrane or an electrically conductive pattern, characterized in that it is prepared by using the electrically conductive paste mentioned in claim 3.

22. An electrically conductive laminate, characterized in that it is prepared by forming the electrically conductive membrane or the electrically conductive pattern mentioned in claim 19 on a fabric substrate.

23. An electrically conductive laminate, characterized in that it is prepared by forming the electrically conductive membrane or the electrically conductive pattern mentioned in claim 20 on a fabric substrate.

24. An electrically conductive laminate, characterized in that it is prepared by forming the electrically conductive membrane or the electrically conductive pattern mentioned in claim 21 on a fabric substrate.

25. An electrically conductive paste wherein a conductive filler (B) is uniformly dispersed in a resin (A), characterized in that the resin (A) is a rubber (A1) containing sulfur atom and/or a rubber (A2) containing nitrile group, that the conductive filler (B) is metal powder (B1) having an average particle diameter of 0.5 to 10 μm and a metal nanowire (B2) having an aspect ratio of 20 to 5,000, and that compounding amounts of the resin (A), the metal powder (B1) and the metal nanowire (B2) in the solid content of the electrically conductive paste are 50 to 80% by volume, 19 to 49% by volume and 1 to 10% by volume, respectively.

* * * * *